(12) United States Patent
Holloway et al.

(10) Patent No.: US 8,907,639 B2
(45) Date of Patent: Dec. 9, 2014

(54) BOOST POWER CONVERTER WITH HIGH-SIDE ACTIVE DAMPING IN DISCONTINUOUS CONDUCTION MODE

(75) Inventors: Rendon Holloway, Campbell, CA (US); Adrian Ong, Mountain View, CA (US); Howard Hou, Cupertino, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 627 days.

(21) Appl. No.: 13/193,311

(22) Filed: Jul. 28, 2011

(65) Prior Publication Data
US 2013/0027006 A1 Jan. 31, 2013

(51) Int. Cl.
*G05F 1/00* (2006.01)
*H02M 3/158* (2006.01)

(52) U.S. Cl.
CPC ................................ *H02M 3/158* (2013.01)
USPC .......................................... 323/222; 323/209

(58) Field of Classification Search
USPC ......... 323/205, 207, 208, 209, 220, 222, 235, 323/259, 293, 282–285
See application file for complete search history.

(56) References Cited

U.S. PATENT DOCUMENTS

| | | | |
|---|---|---|---|
| 6,522,108 B2* | 2/2003 | Prager et al. ................. | 323/222 |
| 7,230,838 B2 | 6/2007 | Xu | |
| 7,432,614 B2 | 10/2008 | Ma et al. | |
| 7,632,614 B2* | 12/2009 | Kosa et al. .................... | 430/5 |
| 2009/0027027 A1* | 1/2009 | Lin et al. ....................... | 323/285 |

OTHER PUBLICATIONS

Gusseme et al., "Input Current Distortion of CCM Boost PFC Converters Operated in DCM," IEEE PESC Conf. Rec. 2003, pp. 1685-1690.
Infineon application note on the ICB2FL01G, Smart Ballast Control IC for Flourescent Lamp Ballasts Demoboard for 54W T5 Single Lamp Design with Voltage Mode preheating, Application Note, Rev. 1.0, Mar. 2009.
Infineon datasheet V1.2 for the ICB2FL01G Smart Ballast Control IC for Fluorescent Lamp Ballasts, May 2009, p. 9.
Texas Instruments, "Understanding Boost Power Stages in Switchmode Power Supplies," Application Report, Mixed Signal Products, Mar. 1999.

* cited by examiner

*Primary Examiner* — Nguyen Tran
(74) *Attorney, Agent, or Firm* — Grossman Tucker Perreault & Pfleger PLLC

(57) ABSTRACT

A boost power converter system according to one embodiment includes an input voltage high-side node; an inductor coupled to the input voltage high-side node at a first terminal of the inductor; a power switch coupled to the inductor at a second terminal of the inductor; a drive circuit configured to control the power switch such that the boost power converter system operates in a discontinuous conduction mode when a load current drops below a critical conduction threshold; and a damping switch configured to enable current flow from the power switch at the second terminal of the inductor to the input voltage high-side node, wherein the damping switch is closed when the power switch is open and the damping switch is opened when the power switch is closed.

11 Claims, 5 Drawing Sheets

US 8,907,639 B2

BOOST POWER CONVERTER WITH HIGH-SIDE ACTIVE DAMPING IN DISCONTINUOUS CONDUCTION MODE

FIELD

The present disclosure relates to a boost power converter, and more particularly, to a boost power converter with high-side active damping in discontinuous conduction mode.

BACKGROUND

A boost power converter is one type of switching mode power supply which converts an input direct current (DC) voltage to a higher, output DC voltage of the same polarity. Boost power converters may operate in a discontinuous conduction mode, where current flow through the inductor is zero for a portion of the switching cycle. When the inductor current reaches zero, the power converter will ring or oscillate due to the effects of parasitic capacitance in the power switch and rectifier diodes. This ringing can destabilize the control loop of the converter and decrease conversion efficiency. Furthermore, when the boost converter is used for active power factor correction, the ringing can introduce spurious harmonics in the line current, resulting in an undesirable reduction of the power factor.

One solution to this problem is to use a passive resistor-capacitor (RC) network connecting the converter switch node to ground which dampens out the oscillations. This approach, however, requires a relatively large capacitor which consumes too much die area, in the case of an integrated solution, or additional external components, in the case of a discrete solution. Another approach is to use an active damper (i.e., a low side damping switch) between the converter switch node and ground, but this wastes power and decreases the converter efficiency.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides a boost power converter operating in discontinuous conduction mode (DCM) with high-side active damping to reduce ringing and increase stability and efficiency of the converter. Advantageously, the boost power converter of the present disclosure can achieve critical damping of the oscillations since the adverse impact on converter efficiency, which would be imposed under exiting solutions, is avoided with high-side active damping.

Boost power converters are one type of switching mode power supply and generally include a power switch, a rectifier and a filter; the filter further comprising an inductor-capacitor network. The power switch is turned on and off, under the control of a drive circuit, to produce a pulse train, of which either the pulse-width or the pulse frequency is modulated to effect control of the converter, for example, to respond to changing output load conditions. The rectifier and filter convert the pulse train to a DC output voltage. Under certain output load conditions, the load current exceeds a critical conduction threshold and the converter operates in a continuous conduction mode, while, during other output load conditions, the load current drops below the critical conduction threshold and the converter operates in discontinuous conduction mode. When the converter operates in a discontinuous conduction mode, current flow through the inductor is zero for a portion of the switching cycle of the power switch, causing the power converter to ring or oscillate due to the effects of parasitic capacitance in the power switch and rectifier diodes. This ringing can destabilize the control loop of the converter and decrease conversion efficiency if damping is not provided.

Figure 1:
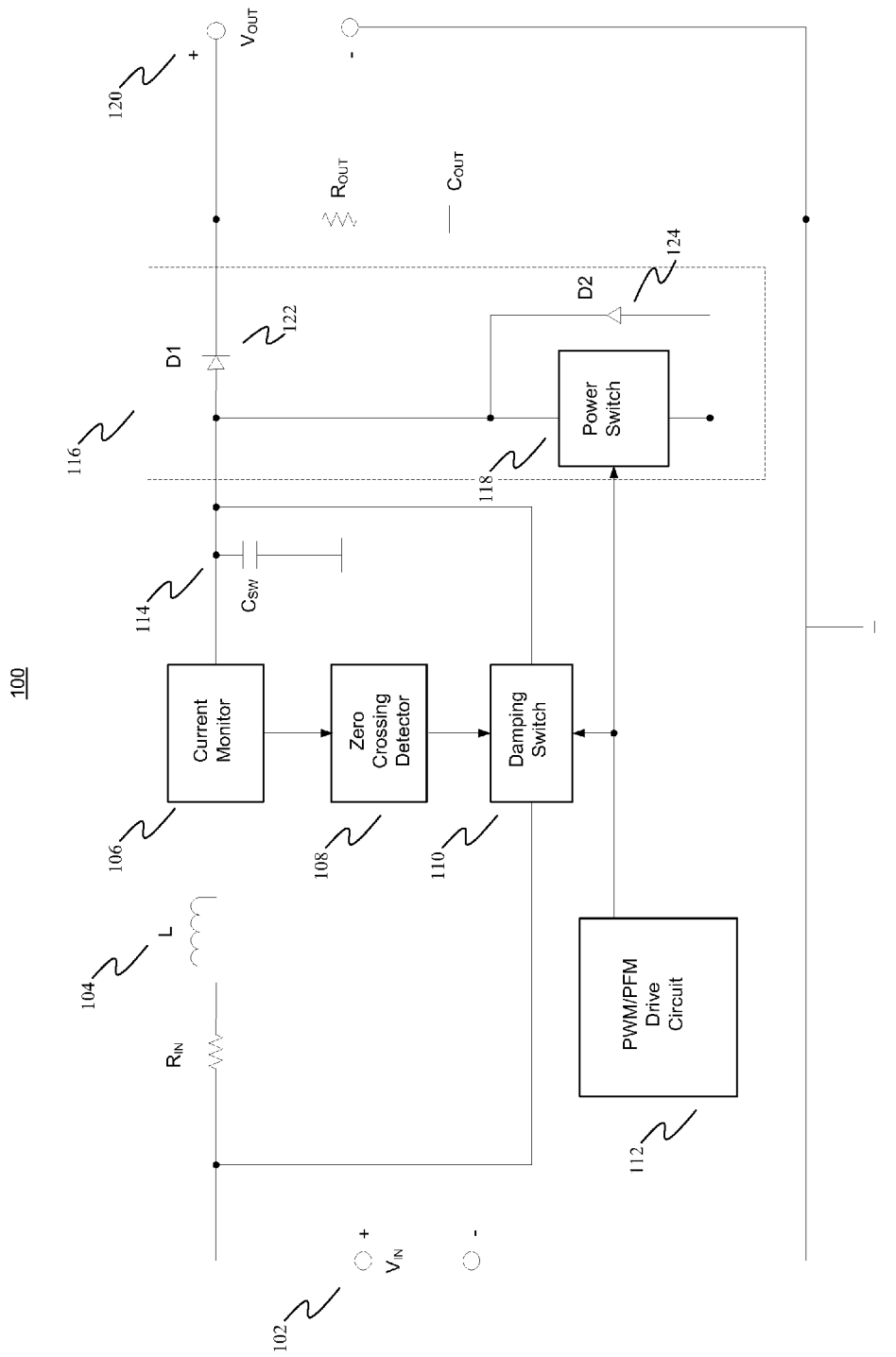
FIG. 1 illustrates a circuit block diagram of one exemplary embodiment consistent with the present disclosure.

FIG. 1 illustrates a circuit block diagram 100 of one exemplary embodiment consistent with the present disclosure. Circuit block diagram 100 generally includes an input voltage port $V_{IN}$ with a high side node 102, an output voltage port $V_{OUT}$ 120, inductor L 104, asynchronous rectifier circuit 116 and pulse-width modulation (PWM) or pulse-frequency modulation (PFM) drive circuit 112. Asynchronous rectifier circuit 116 further comprises power switch 118 and rectifier diodes D1 122 and D2 124. Switching times of power switch 118 are controlled by PWM/PFM drive circuit 112. Parasitic capacitance associated with asynchronous rectifier circuit 116 is represented by capacitor $C_{SW}$ 114. Damping switch 110 may be connected in series between high-side voltage input 102 and Asynchronous rectifier circuit 116.

During operation of the converter, current monitor 106 monitors current flow through inductor L 104. When power switch 118 is open, current flow through inductor L 104 decreases. Zero crossing detector 108 generates a trigger when the monitored current flow through inductor L 104 reaches a substantially zero value. This trigger may then close damping switch 110 enabling feedback of some portion of the current flow from the power switch node back to the high-side voltage input 102 of the converter. This current feedback dampens the oscillations in inductor L 104. The portion of the current flow that is fed back, and thus the level of damping, depends on the effective resistance of damping switch 110 in the closed state ($RDS_{ON}$). Critical damping is achieved when $RDS_{ON} = \frac{1}{2}\sqrt{(L/C_{SW})}$. Damping switch 110 may be re-opened when power switch 118 is closed.

In some embodiments, the closure of damping switch 110 is based solely on the opening of power switch 118, since the decrease in current flow through inductor L 104 occurs when power switch 118 is open. In some embodiments, damping switch 110 may be a controllable resistor.

Figure 2:
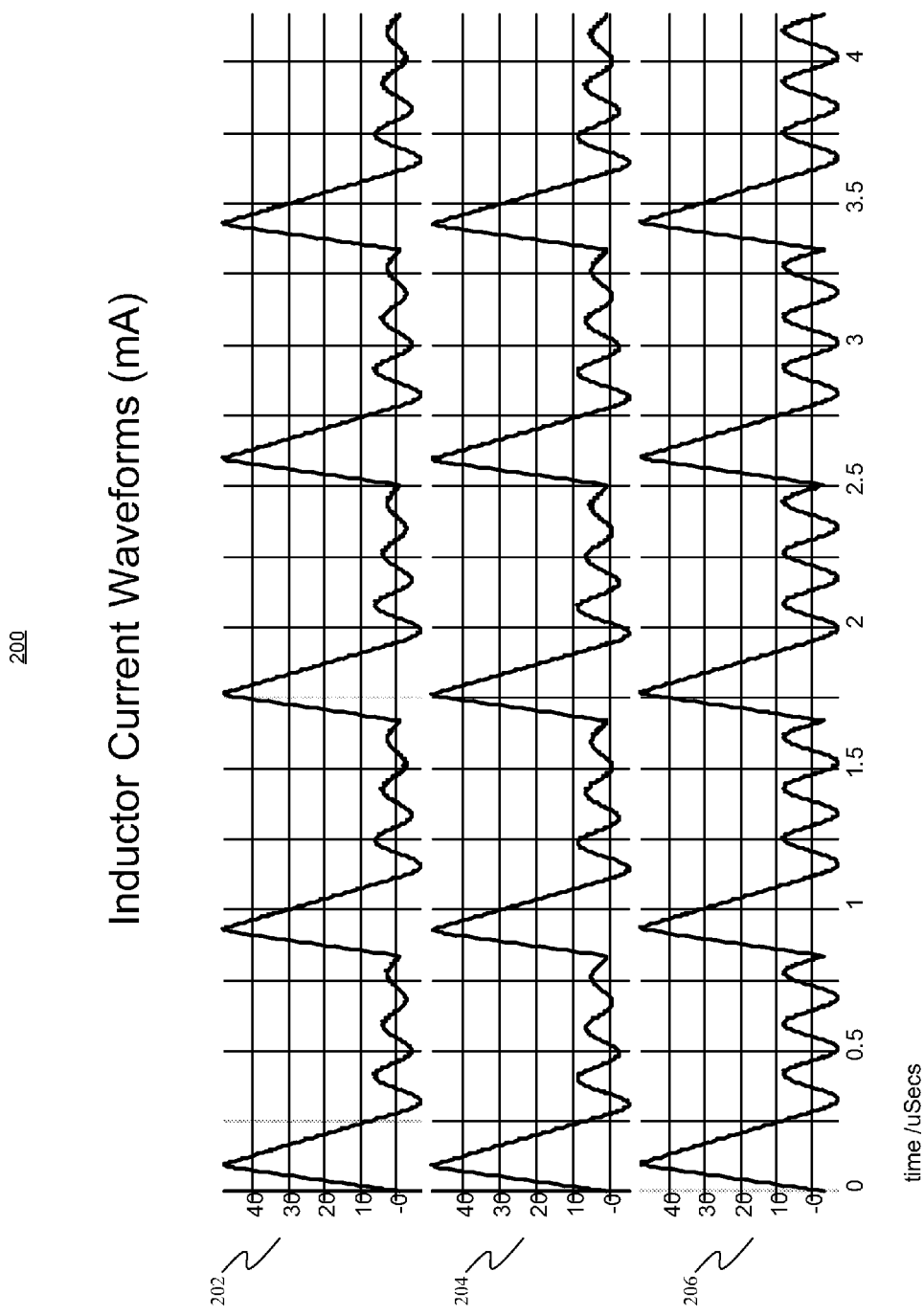
FIG. 2 illustrates inductor current waveforms comparing prior art implementations to an exemplary embodiment consistent with the present disclosure.

FIG. 2 illustrates inductor current waveforms 200 comparing prior art implementations to an exemplary embodiment consistent with the present disclosure. Graph 206 illustrates the magnitude of ringing in milliamps (mA) that is generated in the absence of any damping. Graph 204 illustrates the magnitude of ringing in mA that is generated by a prior art implementation in which current is fed back through a damping switch to the low-side voltage input (i.e., ground). The damping switch has an $RDS_{ON}$ that is approximately fourteen times greater than the resistance associated with critical damping. Graph 202 illustrates the magnitude of ringing in mA that is generated by an exemplary embodiment consistent with the present disclosure in which current is fed back through a damping switch to the high-side voltage input. The damping switch also has an $RDS_{ON}$ that is approximately fourteen times greater than the resistance associated with critical damping. These graphs show that the prior art implementation 204 offers an improvement (decrease) in the ringing over the non-damped case 206. The graphs further show that the exemplary embodiment consistent with the present disclosure 202 provides additional improvement (decrease) in ringing over the prior art case 204, but does so, as will be discussed below, with greater power efficiency.

Figure 3:
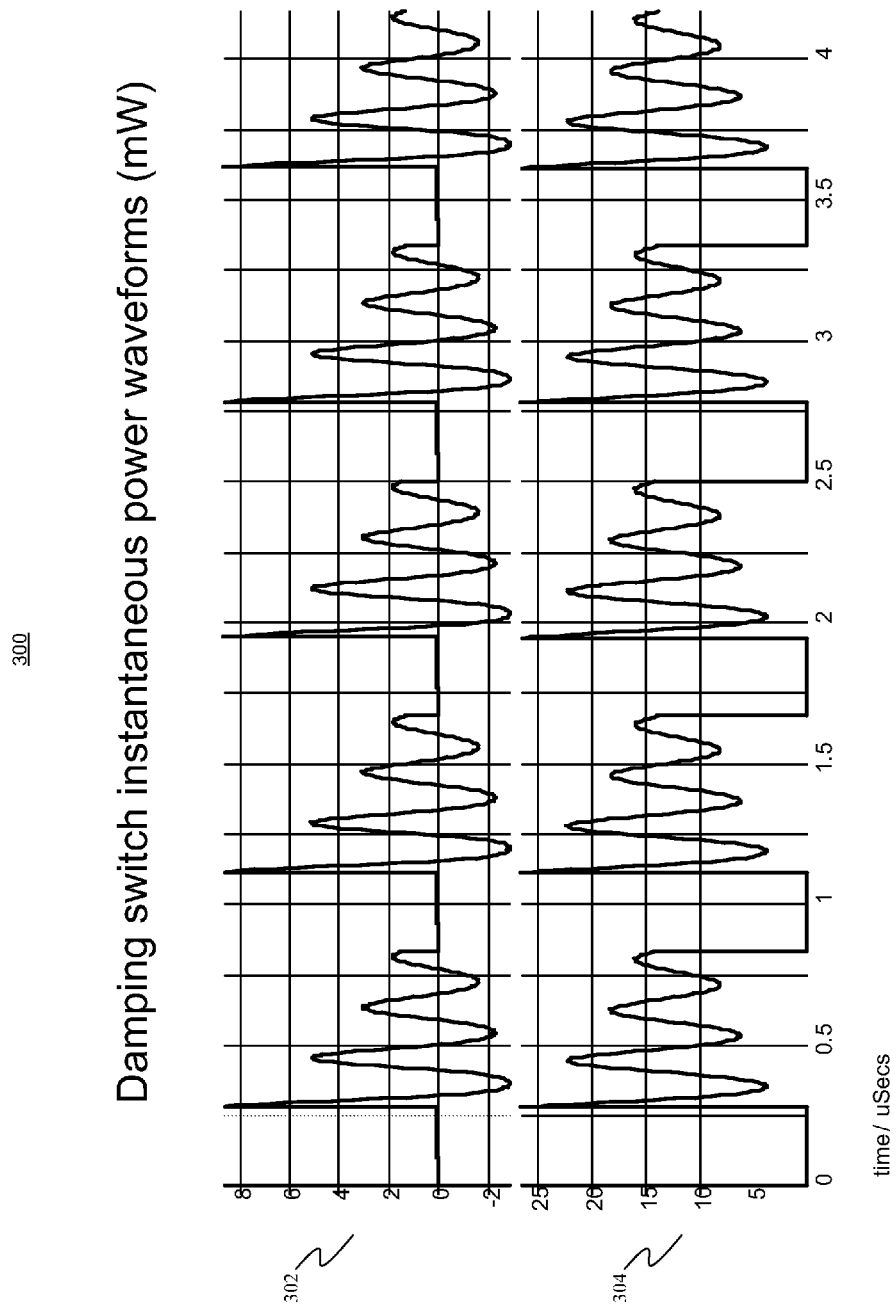
FIG. 3 illustrates damping switch power waveforms comparing a prior art implementation to an exemplary embodiment consistent with the present disclosure.

FIG. 3 illustrates damping switch power waveforms 300 comparing a prior art implementation to an exemplary embodiment consistent with the present disclosure. Graph 304 illustrates the instantaneous power in milliwatts (mW) in the damping switch corresponding to the prior art case discussed above and illustrated in graph 204. Graph 302 illustrates the instantaneous power in milliwatts (mW) in the damping switch corresponding to the exemplary embodiment consistent with the present disclosure discussed above and illustrated in graph 202. These graphs show that the exemplary embodiment consistent with the present disclosure 302 provides a power advantage over the prior art case 304. The average power dissipated in the damping switch of the exemplary embodiment consistent with the present disclosure is 0.31 mW, while the corresponding average power dissipated in the damping switch of the prior art is 8.4 mW. This represents a 27 to 1 factor of improvement over the prior art.

Figure 4:
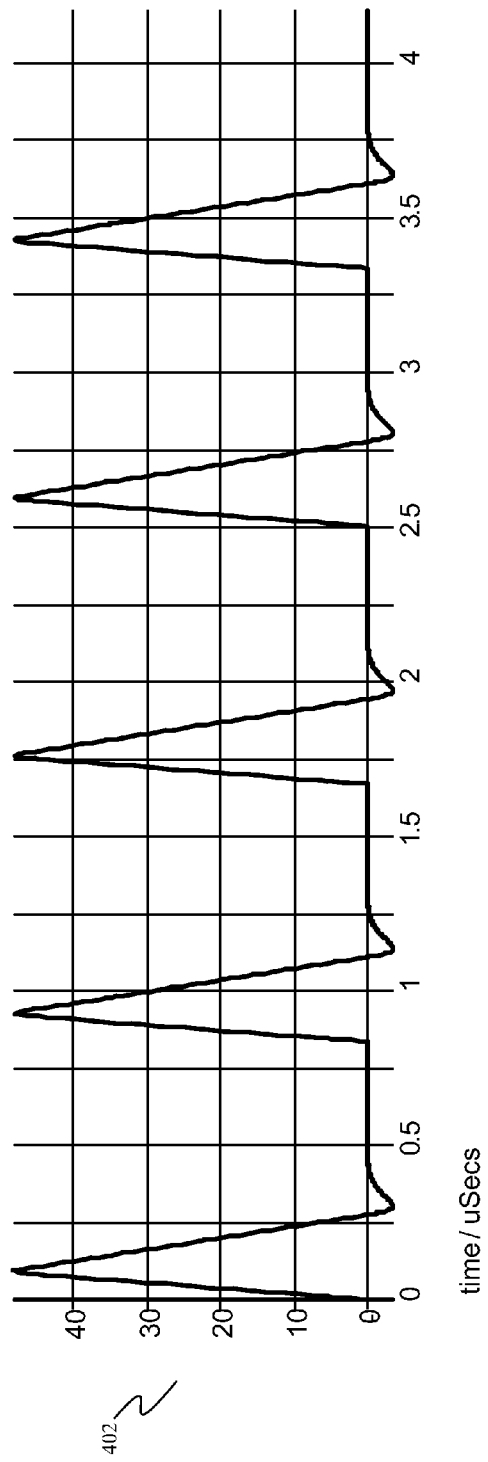
FIG. 4 illustrates inductor current waveform with critical damping consistent with an exemplary embodiment of the present disclosure.

FIG. 4 illustrates inductor current waveform with critical damping 400 consistent with an exemplary embodiment of the present disclosure. Due to the power efficiency improvement associated with embodiments consistent with the present disclosure, the $RDS_{ON}$ value of the damping switch 110 may be decreased to achieve critical damping. Graph 402 illustrates the magnitude of current in mA through inductor L 104 under critical damping conditions. Graph 402 shows that the ringing is substantially eliminated in this case.

Figure 5:
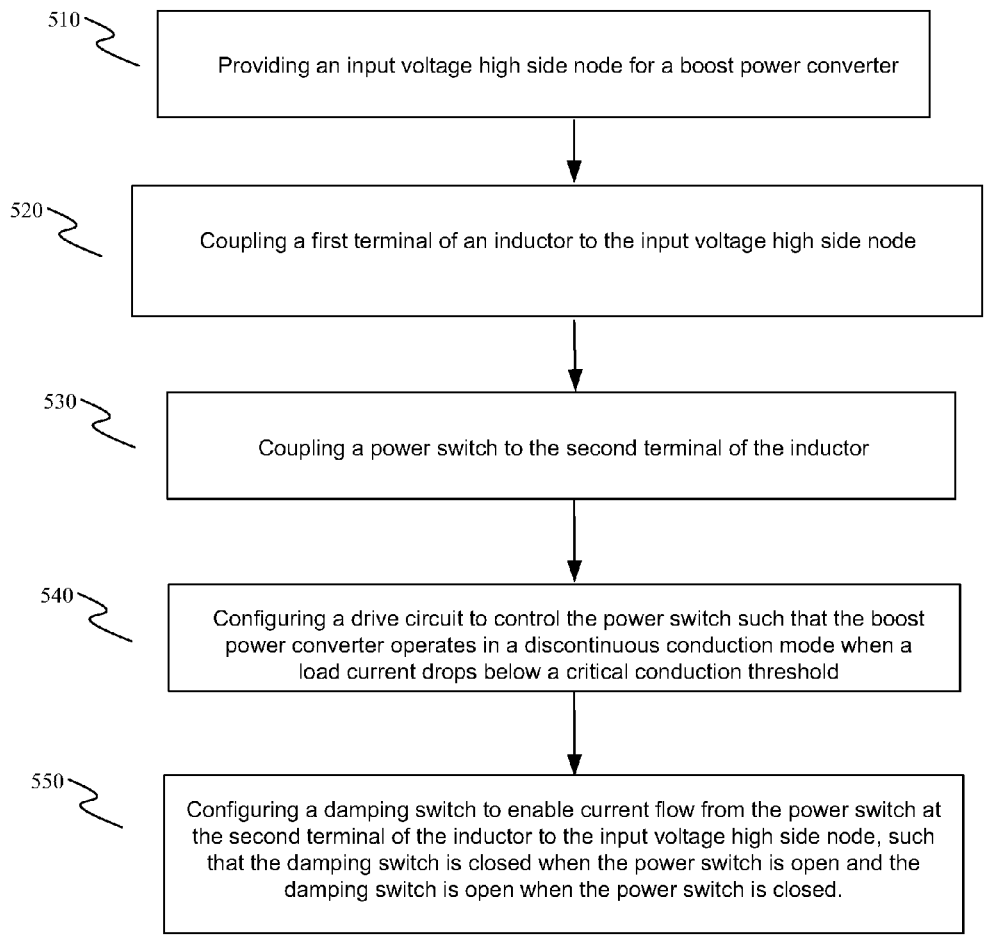
FIG. 5 illustrates a flowchart of operations of one exemplary embodiment consistent with the present disclosure.

FIG. 5 illustrates a flowchart of operations 500 of one exemplary embodiment consistent with the present disclosure. At operation 510, an input voltage high-side node is provided for the boost power converter. At operation 520, a first terminal of an inductor is coupled to the input voltage high-side node. At operation 530, a power switch is coupled to the second terminal of the inductor. At operation 540, a drive circuit is configured to control the power switch such that the boost power converter operates in a discontinuous conduction mode when a load current drops below a critical conduction threshold. At operation 550, a damping switch is configured to enable current flow from the power switch at the second terminal of the inductor to the input voltage high-side node. The damping switch may be connected in series between the power switch and the input voltage high-side node. The damping switch is closed when the power switch is open and the damping switch is open when the power switch is closed. In some embodiments, current flow through the inductor may be monitored and the closure of the damping switch may be further constrained to occur when a zero crossing of the current flow is detected. In some embodiments, the damping switch may be a controllable resistor.

In this description, numerous specific details are set forth. However, it is understood that embodiments of the invention may be practiced without these specific details. In other instances, well-known circuits, structures and techniques have not been shown in detail in order not to obscure an understanding of this description.

References to "one embodiment," "an embodiment," "example embodiment," "various embodiments," etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In this description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

The term "switches" may be embodied as MOSFET switches (e.g. individual NMOS and PMOS elements), BJT switches and/or other switching circuits known in the art. In addition, "circuitry" or "circuit," as used in any embodiment herein, may comprise, for example, singly or in any combination, hardwired circuitry, programmable circuitry, state machine circuitry, and/or circuitry that is included in a larger system, for example, elements that may be included in an integrated circuit.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A boost power converter system, comprising:
an input voltage high-side node;
an inductor coupled to said input voltage high-side node at a first terminal of said inductor;
a power switch coupled to said inductor at a second terminal of said inductor;
a drive circuit configured to control said power switch such that said boost power converter system operates in a discontinuous conduction mode when a load current drops below a critical conduction threshold; and
a damping switch configured to enable current flow from said power switch at said second terminal of said inductor to said input voltage high-side node, wherein said damping switch is closed when said power switch is open and said damping switch is opened when said power switch is closed, and wherein said damping switch is a controllable resistor providing an electrical resistance, in a closed state, in ohms, is equal or greater than $\frac{1}{2}\sqrt{(L/C_{sw})}$, where L is the value of said inductor, in henrys, and $C_{sw}$ is the value of parasitic capacitance at said second terminal of said inductor, in farads.

2. The boost power converter system of claim 1, further comprising:
a current monitor circuit configured to monitor current flow through said inductor; and
a zero crossing detection circuit coupled to said current monitoring circuit, said zero crossing detection circuit configured to detect a zero crossing of said current flow through said inductor, wherein said closure of said damping switch is further limited to occur when said zero crossing detection occurs.

3. The boost power converter system of claim 1, wherein said power switch is configured as an active component of a rectifier circuit, said rectifier circuit in series connection with said damping switch.

4. The boost power converter system of claim 3, wherein said rectifier circuit is configured as an asynchronous rectifier circuit.

5. A method, comprising:
providing an input voltage high-side node for a boost power converter;
coupling an inductor to said input voltage high-side node at a first terminal of said inductor;
coupling a power switch to said inductor at a second terminal of said inductor;
configuring a drive circuit to control said power switch such that said boost power converter operates in a discontinuous conduction mode when a load current drops below a critical conduction threshold; and
configuring a damping switch to enable current flow from said power switch at said second terminal of said inductor to said input voltage high-side node, wherein said damping switch is closed when said power switch is open and said damping switch is opened when said power switch is closed, and wherein said damping switch is a controllable resistor providing an electrical resistance, in a closed state, in ohms, is equal or greater than $\frac{1}{2}\sqrt{(L/C_{sw})}$, where L is the value of said inductor, in henrys, and Csw is the value of parasitic capacitance at said second terminal of said inductor, in farads.

6. The method of claim 5, further comprising:
monitoring current flow through said inductor;
detecting a zero crossing of said monitored current flow; and
limiting closure of said damping switch to occur when said zero crossing detection occurs and said power switch is open.

7. The method of claim 5, further comprising configuring said power switch as an active component of a rectifier circuit, said rectifier circuit in series connection with said damping switch.

8. The method of claim 7, wherein said rectifier circuit is configured as an asynchronous rectifier circuit.

9. A device, comprising:
an input voltage high-side node;
an inductor coupled to said input voltage high-side node at a first terminal of said inductor;
a power switch coupled to said inductor at a second terminal of said inductor;
a drive circuit configured to control said power switch such that said device operates in a discontinuous conduction mode when a load current drops below a critical conduction threshold; and
a damping switch configured to enable current flow from said power switch at said second terminal of said inductor to said input voltage high-side node, wherein said damping switch is closed when said power switch is open and said damping switch is opened when said power switch is closed, and wherein said damping switch is a controllable resistor providing an electrical resistance, in a closed state, in ohms, is equal or greater than $\frac{1}{2}\sqrt{(L/C_{sw})}$, where L is the value of said inductor, in henrys, and Csw is the value of parasitic capacitance at said second terminal of said inductor, in farads.

10. The device of claim 9, further comprising:
a current monitor circuit configured to monitor current flow through said inductor; and
a zero crossing detection circuit coupled to said current monitoring circuit, said zero crossing detection circuit configured to detect a zero crossing of said current flow through said inductor, wherein said closure of said damping switch is further limited to occur when said zero crossing detection occurs.

11. The device of claim 9, wherein said power switch is configured as an active component of a rectifier circuit, said rectifier circuit in series connection with said damping switch.

* * * * *